United States Patent
Ikawa

(10) Patent No.: US 10,951,788 B2
(45) Date of Patent: Mar. 16, 2021

(54) IMAGE FORMING APPARATUS FORMING IMAGE ON IMAGE FORMING MEDIUM, IMAGE FORMING METHOD, AND COMPUTER-READABLE NON-TRANSITORY RECORDING MEDIUM STORING IMAGE FORMING PROGRAM

(71) Applicant: KYOCERA Document Solutions Inc., Osaka (JP)

(72) Inventor: Koji Ikawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/733,820

(22) Filed: Jan. 3, 2020

(65) Prior Publication Data
US 2020/0236227 A1 Jul. 23, 2020

(30) Foreign Application Priority Data
Jan. 23, 2019 (JP) .............................. JP2019-009454

(51) Int. Cl.
*H04N 1/00* (2006.01)
*H04N 1/21* (2006.01)

(52) U.S. Cl.
CPC ....... *H04N 1/0097* (2013.01); *H04N 1/00477* (2013.01); *H04N 1/00938* (2013.01); *H04N 1/2158* (2013.01)

(58) Field of Classification Search
CPC ...... G06F 3/1203–1205; G06F 3/1239; H04N 1/0097; H04N 1/0009; H04N 1/2166; H04N 2201/0087; H04N 1/346; H04N 1/32358; H04N 2201/0094

USPC .................................... 358/474, 1.13, 1.15
See application file for complete search history.

(56) References Cited

U.S. PATENT DOCUMENTS 9,509,881 B2 * 11/2016 Mizuno ................ H04N 1/2179
9,948,809 B2 * 4/2018 Hamaguchi .......... H04N 1/0097
10,805,496 B2 * 10/2020 Shibata ................. G06F 3/1232

FOREIGN PATENT DOCUMENTS

JP 2011-010211 A 1/2011

* cited by examiner

*Primary Examiner* — Kent Yip
(74) *Attorney, Agent, or Firm* — IP Business Solutions, LLC

(57) ABSTRACT

An image forming apparatus includes: a hard disc drive storing a database including image formation authority of a registered user and a remaining available amount and ID information for specifying the remaining available amount of the database to be updated based on processing detail data serving as data indicating processing details of the image forming apparatus; an image forming device; an auxiliary storage device storing processing management data including the processing detail data; and a controller managing details of processing performed by the image forming device. After ending of processing performed by the registered user, the controller uses the processing management data stored in the auxiliary storage device to update the remaining available amount specified by use of the ID information and deletes the processing management data from the auxiliary storage device in response to completion of the update.

14 Claims, 4 Drawing Sheets

Fig.3

| ID | DEPARTMENT | EMPLOYEE NUMBER | NAME | E-MAIL ADDRESS | FAX NUMBER | PASSWORD |
|---|---|---|---|---|---|---|
| 1 | DEVELOPMENT DEPARTMENT | 840337 | AAAA | AAAA@mfpcorp.com | 06-1234-5678 | rjYvNfRW |
| 2 | SALES DEPARTMENT | 309161 | BBBB | BBBB@mfpcorp.com | 06-1234-5679 | 2GSbde2K |
| 3 | DEVELOPMENT DEPARTMENT | 207884 | CCCC | CCCC@mfpcorp.com | 06-1234-5678 | Ckmpa5sT |
| 4 | DEVELOPMENT DEPARTMENT | 157424 | DDDD | DDDD@mfpcorp.com | 06-1234-5678 | Pc5i840D |
| 5 | SALES DEPARTMENT | 895854 | EEEE | EEEE@mfpcorp.com | 06-1234-5679 | 64Dhhcpz |
| 6 | SALES DEPARTMENT | 532686 | FFFF | FFFF@mfpcorp.com | 06-1234-5679 | G5n96XV8 |
|  |  |  |  |  |  |  |

HDB1

Fig.4

HDB2

| NO. | DEPARTMENT | MONOCHROMATIC READING (PLAN) | MONOCHROMATIC READING (REMAINING AMOUNT) | COLOR READING (PLAN) | COLOR READING (REMAINING AMOUNT) |
|---|---|---|---|---|---|
| 1 | DEVELOPMENT DEPARTMENT | 120,000 | 87,241 | 10,000 | 5,453 |
| 2 | SALES DEPARTMENT | 150,000 | 77,030 | 50,000 | 37,724 |

HDB2

| NO. | DEPARTMENT | MONOCHROMATIC PRINTING (PLAN) | MONOCHROMATIC PRINTING (REMAINING AMOUNT) | COLOR PRINTING (PLAN) | COLOR PRINTING (REMAINING AMOUNT) | BOX CAPACITY (DISTRIBUTION) | BOX CAPACITY (REMAINING AMOUNT) |
|---|---|---|---|---|---|---|---|
| 1 | DEVELOPMENT DEPARTMENT | 80,000 | 40,548 | 1,000 | 755 | 150GB | 59GB |
| 2 | SALES DEPARTMENT | 120,000 | 72,512 | 5,000 | 3,302 | 200GB | 78GB |

ST

| ID | MONOCHROMATIC READING | COLOR READING | MONOCHROMATIC PRINTING | COLOR PRINTING | BOX CAPACITY |
|---|---|---|---|---|---|
| 3 | 0 | 15 | 0 | 14 | 0GB |

IMAGE FORMING APPARATUS FORMING IMAGE ON IMAGE FORMING MEDIUM, IMAGE FORMING METHOD, AND COMPUTER-READABLE NON-TRANSITORY RECORDING MEDIUM STORING IMAGE FORMING PROGRAM

INCORPORATION BY REFERENCE

This application claims priority to Japanese Patent Application No. 2019-009454 filed on Jan. 23, 2019, the entire contents of which are incorporated by reference herein.

BACKGROUND

This disclosure relates to an image forming apparatus, an image forming method, and a computer-readable non-transitory recording medium storing an image forming program.

Image forming apparatuses are typically equipped with a hard disc drive as a storage device. The hard disc drive is used for various applications such as media serving as install destinations of an operating system or an application and a BOX function. The hard disc drive is also used as a storage region for storing scanned image data upon copying. Consequently, for example, even upon interruption of copy operation such as jam recovery or power failure, it is possible to continue the copy operation while avoiding page missing, which can be achieved through automatic reprinting by use of the scanned image data stored in the hard disc drive. Image forming apparatuses are also typically equipped with an automatic document feeder, realizing large-volume copying at a high speed.

SUMMARY

A technology obtained by further improving the technology described above will be suggested as one aspect of this disclosure.

An image forming apparatus according to one aspect of this disclosure includes an image reading device, a hard disc drive, an image forming device, an auxiliary storage device, and a control device. The image reading device reads an image on a document to generate image data indicating the read image. The hard disc drive stores the image data generated, a database, and ID information, the database including image formation authority of a registered user registered as a user of the image forming apparatus and a remaining available amount, the ID information being for specifying the remaining available amount of the database to be updated based on processing detail data serving as data indicating processing details of the image forming apparatus. The image forming device forms an image on an image formation medium by use of the image data read from the hard disc drive. The auxiliary storage device has a nonvolatile memory and stores, into the nonvolatile memory, processing management data including the processing detail data. The control device includes a processor, and when the processor executes a control program, functions as a controller. The controller controls the image reading device, the hard disc drive, and the auxiliary storage device, and manages details of processing performed by the image forming device by use of the processing management data. After ending of processing performed by the registered user, the controller uses the processing management data stored in the nonvolatile memory to update the remaining available amount specified by use of the ID information and deletes the processing management data from the nonvolatile memory in response to completion of the update.

An image forming method according to another aspect of this disclosure includes: an image reading step, a storage step, an image forming step, an auxiliary storage step, and a control step. The image reading step includes reading an image on a document to generate image data indicating the read image. The storage step includes storing, into a hard disc drive: the image data generated; a database; and ID information, the database including image formation authority of a registered user registered as a user of an image forming apparatus and a remaining available amount, the ID information being for specifying the remaining available amount of the database to be updated based on processing detail data serving as data indicating processing details of the image forming apparatus. The image forming step includes forming an image on an image formation medium by use of the image data read from the hard disc drive. The auxiliary storage step includes using a nonvolatile memory and storing, into the nonvolatile memory, processing management data including the processing detail data. The control step includes controlling the image reading step, the storage step, and the auxiliary storage step and managing details of processing performed in the image formation step by use of the processing management data. The control step includes a step of, after ending of processing performed by the registered user, updating, by use of the processing management data stored in the nonvolatile memory, the remaining available amount specified by use of the ID information and deleting the processing management data from the nonvolatile memory in response to completion of the update.

In a computer-readable non-transitory recording medium storing an image forming program according to another aspect of this disclosure, the image forming program causes a computer including a processor to function as a controller when the processor executes the image forming program. The image forming program further causes the computer to function so that the controller controls each of: (i) an image reading device reading an image on a document to generate image data; (ii) a hard disc drive storing: the image data generated; a database; and ID information, the database including image formation authority of a registered user registered as a user of an image forming apparatus and a remaining available amount, the ID information being for specifying the remaining available amount of the database to be updated based on processing detail data serving as data indicating processing details of the image forming apparatus; and (iii) an auxiliary storage device storing, into a nonvolatile memory, processing management data including the processing detail data, and manages, by use of the processing management data, details of processing performed by the image forming device which forms an image on an image formation medium by use of the image data read from the hard disc drive. The controller, after ending of processing performed by the registered user, updates, by use of the processing management data stored in the nonvolatile memory, the remaining available amount specified by use of the ID information and deletes the processing management data from the nonvolatile memory in response to completion of the update.

BRIEF DESCRIPTION OF THE DRAWINGS

FIG. 3 is a diagram illustrating contents of an employee management database stored in a storage device of the image forming apparatus according to one embodiment of this disclosure.

FIG. 4 is a diagram illustrating contents of print management data stored in the storage device and an auxiliary storage device of the image forming apparatus according to one embodiment of this disclosure.

DETAILED DESCRIPTION

Hereinafter, a mode for implementing this disclosure (hereinafter referred to as "embodiment") will be described with reference to the drawings.

Figure 1:
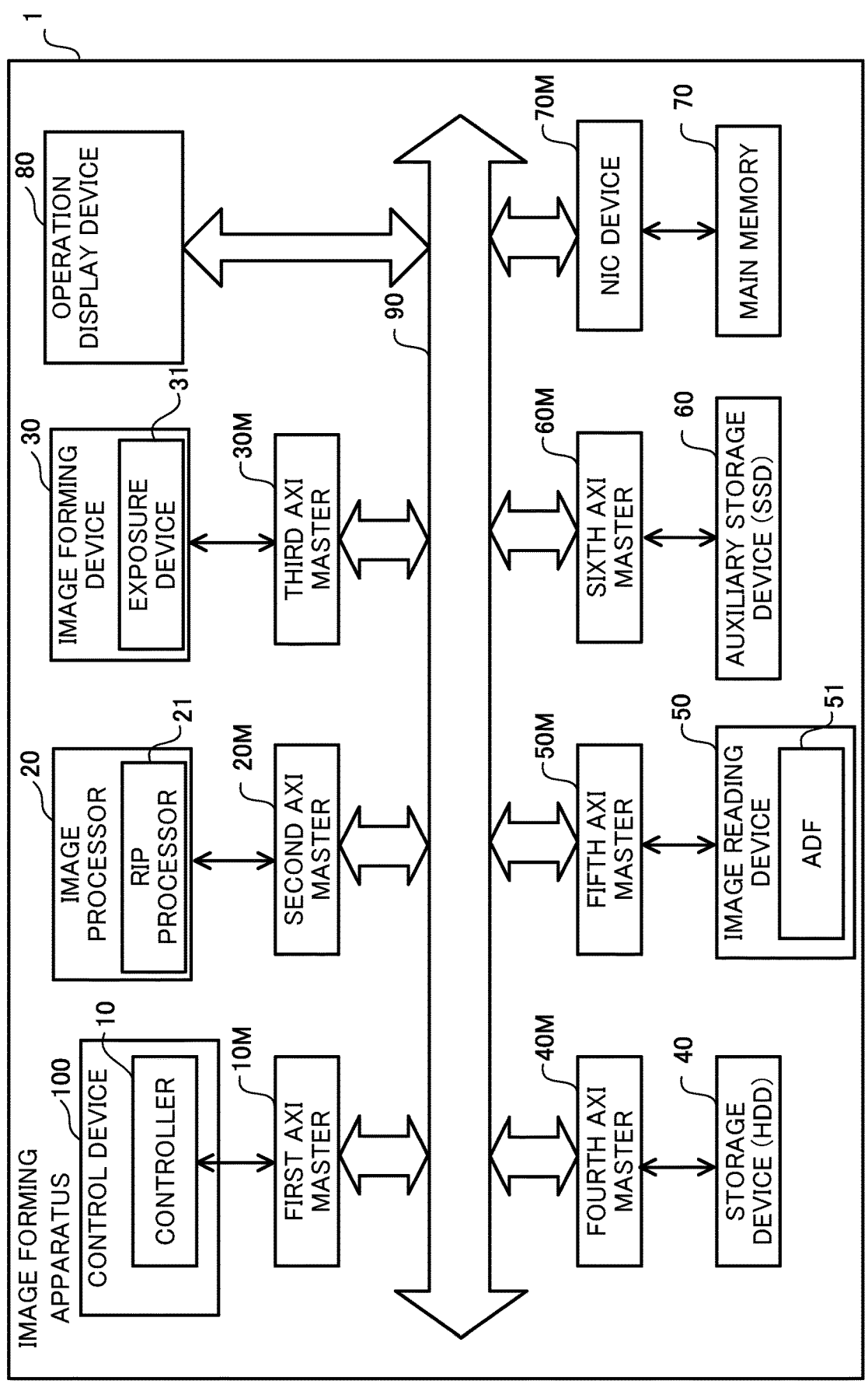
FIG. 1 is a block diagram illustrating functional configuration of an image forming apparatus according to one embodiment of this disclosure.

FIG. 1 is a block diagram illustrating functional configuration of an image forming apparatus according to one embodiment of this disclosure. The image forming apparatus 1 includes: a control device 100 including a controller 10, an image processor 20, an image forming device 30, a storage device 40, an image reading device 50, an auxiliary storage device 60, a main memory 70, an operation display device 80, and an AXI bus 90 connecting together the aforementioned devices. The main memory 70 is a double-data-rate synchronous dynamic random access memory (DDR SDRAM).

The image processor 20 has an RIP processor 21. The image forming device 30 has an exposure device 31. The image reading device 50 has an automatic document feeder (called ADF) and reads images on a plurality of documents supplied from the ADF 51 to generate image data indicating the read images. In this embodiment, an advanced extensible interface (AXI) bus 90 based on AXI specifications used in a main bus of a high-performance system is adopted as a data bus as one example.

The storage device 40 is a hard disc drive (HDD) as a nonvolatile storage region. The auxiliary storage device 60 is configured as a solid-state drive (SSD) which adopts a flash memory as a nonvolatile memory. The number of times of writing in the nonvolatile memory is limited, and thus the nonvolatile memory is equipped in the image forming apparatus 1 in a replaceable manner. The nonvolatile memory is disposed while data therein is erased irretrievably through a secure erase function.

The image forming apparatus 1 further includes: a first AXI master 10M connected to the controller 10; a second AXI master 20M connected to the image processor 20; a third AXI master 30M connected to the image forming device 30; a forth AXI master 40M connected to the storage device 40 (HDD); a fifth AXI master 50M connected to the image reading device 50; a sixth AXI master 60M connected to the auxiliary storage device 60; and a network interconnect device (called an NIC device) 70M connected to the main memory 70.

The first AXI master 10M, the second AXI master 20M, the third AXI master 30M, the fourth AXI master 40M, the fifth AXI master 50M, the sixth AXI master 60M, and the NIC device 70M have a direct memory access (DMA) control function.

The AXI bus 90 enables communication between the devices in accordance with an AXI protocol. The AXI bus 90 supports a quality of service (QOS) value based on the AXI protocol. In this example, the QOS values represent priority of communication as two-bit data with values 0 to 3. More specifically, for example, the QOS value 0 represents permission of use of a dedicated band. The QOS value 1 represents high priority, the QOS value 2 represents middle priority, and the QOS value 3 represents low priority.

The control device 100 includes: a processor, a random access memory (RAM), a read only memory (ROM), etc. The processor is for example, a central processing unit (CPU), a micro-processing unit (MPU), or an application specific integrated circuit (ASIC). The control device 100 may be formed by a hardware circuit without depending on the aforementioned control program. The control device 100 functions as a controller 10 as a result of executing a control program (image forming program) stored in the aforementioned ROM or the storage device 40 by the processor. Note that the controller 10 may be formed by a hard circuit without depending on the aforementioned control program. Moreover, the controller 10 includes a controller function related to interfaces such as various I/Os, USBs (universal serial buses), buses, and other types of hardware. The controller 10 performs overall control of the image forming apparatus 1.

The storage device 40 is a hard disc drive as a non-transitory storage medium, and stores control programs and data of processing executed by the controller 10.

Figure 2:
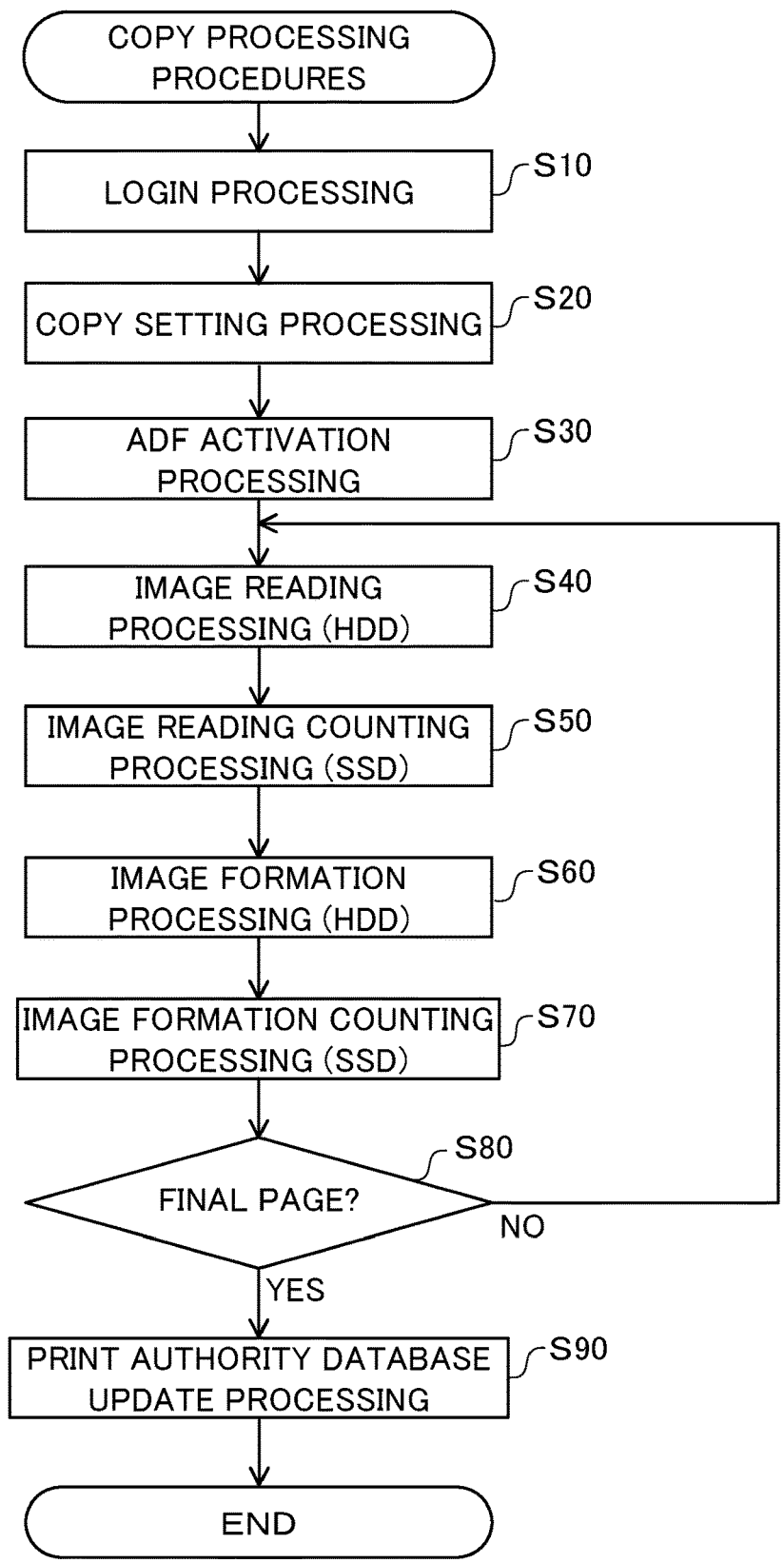
FIG. 2 is a flowchart illustrating details of copy processing procedures in the image forming apparatus according to one embodiment of this disclosure.

FIG. 2 is a flowchart illustrating details of copy processing procedures performed in the image forming apparatus 1 according to one embodiment of this disclosure. FIG. 3 is a diagram illustrating contents of an employee management database stored in the storage device of the image forming apparatus according to one embodiment of this disclosure. The employee management database HDB 1 stores a department, an employee number, a name, an e-mail address, a FAX number, and a password of each employee. The employee number and the password are used for processing of logging in the image forming apparatus 1. Each record can be specified by an ID number (also called ID information).

In step S10, the image forming apparatus 1 executes the login processing. For example, a registered user can bring his or her RFID employee card closely to the operation display device 80 of the image forming apparatus 1 for the login. The image forming apparatus 1 acquires the employee number and the password from the RFID employee card and compares them with the employee management database HDB 1, thereby permitting automatic login of the registered user. The registered user is a user registered in the employee management database HDB 1.

In step S20, the image forming apparatus 1 executes copy setting processing. In the copy setting processing, the user can set color or monochromatic copying and set a copy resolution level from among a plurality of copy resolution levels. It is assumed in this example that the user has selected the color copying with the maximum resolution level for copy. In the example, the color copying with the maximum resolution level is processing which requires a highest access speed for image data writing and reading into and from the storage device 40 (HDD) and which is called specific processing In step S30, the image forming apparatus 1 activates the ADF 51 of the image reading device 50. More specifically, the user sets a plurality of print documents on the ADF 51 and presses a start switch, not illustrated, to start automatic image reading.

In step S40, the image reading device 50 executes image reading processing. In the image reading processing, the image reading device 50 reads the image from the document to generate image data as digital data. The image reading device 50 can write the image data into the storage device 40

(HDD) sequentially via the fifth AXI master 50M, the AXI bus 90, and the fourth AXI master 40M. The fifth AXI master 50M functions as a master module of the fourth AXI master 40M.

The fifth AXI master 50M provides the QOS value 0 through a DMA control function in accordance with a command provided from the controller 10 and transmits a write request packet including the image data to the AXI bus 90. In accordance with a command provided from the fifth AXI master 50M, the AXI bus 90 allocates a dedicated band, provides the QOS value 0, and uses the dedicated band to transmit write request data including the image data to be written to the fourth AXI master 40M.

Consequently, the image forming apparatus 1 can transmit the image data by use of the dedicated band, thus making it possible to eliminate data disposal (data missing) attributable to excessive transmission delay of the pieces of image data sequentially generated in the image reading processing.

The fourth AXI master 40M writes the image data through sequential access to the storage device 40 (HDD) in accordance with the write request data. Consequently, the image reading device 50 can write the image data into the storage device 40 (HDD).

The storage device 40 (HDD) is configured to have constant linear recording density, and has a disc-shaped disc for storing data, and an outer circumferential track of the disc has more sectors than an inner circumferential track. In this embodiment, the storage device 40 (HDD) can write the image data through the sequential access by use of a track dedicated for the specific processing as the outer circumferential track allocated specially for the specific processing. Consequently, it is possible to realize writing at a maximum speed for the performance of the hard disc drive (HDD).

As described above, the image forming apparatus 1 can write the image data into the storage device 40 (HDD). Consequently, the image forming apparatus 1 permits reprinting of the same image even upon interruption of printing processing due to, for example, paper jam or power failure, which can prevent page missing.

FIG. 4 is a diagram illustrating contents of the print management data stored in the storage device and the auxiliary storage device of the image forming apparatus 1 according to one embodiment of this disclosure. The print management data includes: a print authority database HDB 2 stored in the storage device 40 (HDD); and a print execution table ST stored in the nonvolatile memory of the auxiliary storage device 60. In this example, a user registered as ID 3 (employee number 207884) in the employee management database HDB 1 is assumed to log in the image forming apparatus 1.

The user can use the image forming apparatus 1 within a range of authority defined in the print authority database HDB 2. For example, the user with ID 3 belongs to the Development Department (refer to the employee management database HDB 1), and thus can use the image forming apparatus 1 within a range of authority assigned to the Development Department. That is, the user with ID 3 can use the image forming apparatus 1 within a range of a remaining amount (5,453 times) for color reading (color scanning) and a remaining amount (755 pieces) for color printing (color image formation). The aforementioned remaining amounts are available to the user with the ID3 and are remaining available amounts within the range of authority assigned to the Development Department.

In step S50, the controller 10 executes image reading counting processing. In the image reading counting processing, the controller 10 increments a count of color reading on the printing execution table ST by "1". The image reading counting processing is executed in response to completion of the storage of the image data into the storage device 40 (HDD).

The controller 10 transmits the incrementing write request data provided with the QOS value 3 to the auxiliary storage device 60 (SSD). Consequently, the image forming apparatus 1 can suppress processing of random access to the storage device 40 (HDD). As a result, an increase in seek time occurring before and after the random access processing can be suppressed.

More specifically, in accordance with a command provided from the controller 10, the first AXI master 10M transmits, to the AXI bus 90, the write request data provided with the QOS value 3 through the DMA control function. The AXI bus 90 transmits read request data provided with the QOS value 3 to the sixth AXI master 60M without using the dedicated band. The sixth AXI master 60M transmits the incrementing write request data to the auxiliary storage device 60 (SDD) and increments the color reading on the printing execution table ST.

Note that to execute copy processing by a processing method other than the specific processing, the image reading counting processing is executed for the storage device 40 (HDD). Consequently, the number of times of writing to the nonvolatile memory of the auxiliary storage device 60 is reduced, permitting long-term use of the nonvolatile memory.

In step S60, the image forming apparatus 1 execute image formation processing. In the image formation processing, the image processor 20 can read the image data from the storage device 40 (HDD) to receive the image data. More specifically, the second AXI master 20M transmits reading request data provided with the QOS value 2 to the AXI bus 90 through the DMA control function in accordance with a command provided from the image processor 20. The AXI bus 90 transmits the reading request data provided with the QOS value 2 to the fourth AXI master 40M without using the dedicated band.

The fourth AXI master 40M reads the image data through sequential access from the storage device 40 (HDD) in accordance with the reading request data and transmits the image data to the AXI bus 90. The AXI bus 90 transmits a reading data packet including the image data to the second AXI master 20M. In this embodiment, the storage device 40 (HDD) can read the image data through sequential access from the track dedicated for the specific processing. Consequently, it is possible to realize the reading at a maximum speed for the performance of the hard disc drive (HDD).

The RIP processor 21 of the image processor 20 executes raster image processor (RIP) processing on the image data received from the second AXI master 20M. Consequently, the RIP processor 21 can generate pieces of dot data as pieces of bit map data of different colors. The RIP processing includes color conversion processing and half tone processing. The dot data is data for representing a formation state of dots formed on a printing medium by use of a color material. The printing medium such as recording paper or a sheet is called an image formation medium.

Next, the image processor 20 can write the dot data into the main memory 70 sequentially via the second AXI master 20M, the AXI bus 90, and the NIC device 70M in order just mentioned. Consequently, the image forming apparatus 1 can temporarily save the dot data into the main memory 70.

The image forming device 30 can read and receive the dot data from the main memory 70 sequentially via the NIC device 70M, the AXI bus 90, and the third AXI master 30M in order just mentioned. However, the third AXI master 30M executes processing of reading from the main memory 70 by use of the QOS value 0.

Consequently, the image forming apparatus 1 can transmit the dot data by use of the dedicated band, thus making it possible to eliminate dot loss (image loss) attributable to excessive delay in transmission of the dot data sequentially required by the exposure device 31 in the image formation processing.

The exposure device 31 of the image forming device 30 can execute exposure processing on a developer roller (not illustrated) of each color based on the dot data serving as the bit map data of each color. Subsequently, the image forming device 30 can execute the development processing and fixing processing to execute the image formation processing.

In step S70, the controller 10 executes image formation counting processing. In the image formation counting processing, the controller 10 increments the count of color printing on the printing execution table ST by "1". The image formation counting processing is executed in response to discharge of the printing medium from the image forming apparatus 1.

More specifically, the first AXI master 10M transmits, to the AXI bus 90, the write request data provided with the QOS value 3 through the DMA control function in accordance with a command provided form the controller 10. The AXI bus 90 transmits the read request data provided with the QOS value 3 to the sixth AXI master 60M without using the dedicated band. The sixth AXI master 60M transmits the incrementing write request data to the auxiliary storage device 60 (SSD) and increments the color printing on the printing execution table ST.

Consequently, the image forming apparatus 1 can suppress the processing of random access to the storage device 40 (HDD). As a result, an increase in seek time occurring before and after the random access processing can be suppressed.

Note that to execute the copy processing by a processing method other than the specific processing, the image formation counting processing is executed on the storage device 40 (HDD). Consequently, the number of times of writing into the nonvolatile memory of the auxiliary storage device 60 is reduced, permitting long-term use of the nonvolatile memory.

The image forming apparatus 1 executes such processing (steps S40 to S70) up to a final page of the plurality of documents set on the ADF 51 (step S80).

Note that when there has arisen a possibility of excess over the authority of use of the image forming apparatus 1, that is, when a difference between the remaining amount and the use amount has become equal to or less than a threshold value based on the use amount of the printing execution table ST stored in the auxiliary storage device 60 (SSD), the image forming apparatus 1 displays an alarm at the operation display device 80 to notify the event to a system administrator. Moreover, when the difference between the remaining amount and the use amount has become equal to or less than the threshold value, the use of the image forming apparatus 1 may be temporarily stopped.

In step S90, the controller 10 reads the use amount of the printing execution table ST stored in the auxiliary storage device 60 (SSD) and uses the read use amount to update the remaining amount of the print authority database HDB 2. The update of the print authority database HDB 2 is executed by use of the ID information linking together the printing execution table ST and the print authority database HDB 2. The controller 10 deletes the data in the auxiliary storage device 60 in response to completion of the update of the print authority database HDB 2. The printing authority is also called image formation authority.

Note that when the power supply to the image forming apparatus 1 has been stopped due to, for example, power failure during printing execution, the controller 10 can read the use amount of the printing execution table ST stored in the nonvolatile auxiliary storage device 60 (SSD) upon reactivation of the image forming apparatus 1 or recovery of other power and can update the remaining amount of the print authority database HDB 2 by use of the aforementioned use amount. The controller 10 can detect, based on a status of the data which indicates the use amount of the printing execution table ST and which is not deleted and remains in the auxiliary storage device 60, that the update of the remaining amount of the print authority database HDB 2 has not completed.

The inventor of the present application has found that, for example, processing capability of the image forming apparatus 1 improves as the entire system as a result of adopting, for example, a main bus based on the AXI specification while write processing and read processing in the storage device 40 (HDD) become a bottle neck in the copy processing where image data saving processing and read processing are executed.

The image forming apparatus 1 according to one embodiment can be provided with the auxiliary storage device 60 as a data storage destination for management of the print processing such as the image formation counting processing and image reading counting processing, thereby permitting the processing in the storage device 40 (HDD) to be focused on the image data writing and reading. Consequently, the image forming apparatus 1 can suppress deterioration in the performance of the copy processing attributable to limitations on the processing capability of the storage device 40 (HDD) in color copying with high resolution when using the ADF 51 whose data transfer amount increases.

Further, the inventor of the present application has created configuration such that part of the image data is stored into the auxiliary storage device 60 in color copying with high resolution with which the data amount increases. More specifically, the image forming apparatus 1 can be provided with a high-speed processing mode in the color copying with high resolution when using the ADF 51. More specifically, the image forming apparatus 1 can store the image data into the auxiliary storage device 60 with a ratio of one to N-number of pieces (where N is an integer number of 2 or more), thereby achieving a higher speed. The ratio can be set based on the performance of the entire system and the performance of the hard disc drive. Consequently, it is possible to ensure time for reading the image data even if some time is required for writing color image data with high resolution.

Note that, in response to completion of the high-speed processing mode, the auxiliary storage device 60 can be initially set to erase the data in a manner such that the data cannot be restored through the secure erase function. Consequently, it is possible to suppress outflow of the image data.

On the other hand, since the nonvolatile memory has limitations on the number of times of writing and is equipped in the image forming apparatus 1 in a replaceable manner, the inventor of the present application has provided configuration such that contents of the printing execution table ST has no significance outside of the image forming apparatus 1. That is, the contents of the printing execution table ST are data which have significance only when tied to and combined with the employee management database HDB 1 and the print authority database HDB 2.

Specifically, the printing execution table ST includes: details and the amount of processing performed in the image forming apparatus 1; and ID information for specifying a related record (that is, a remaining available amount) in the print authority database HDB 2, and is composed of data for updating the contents of the print authority database HDB 2, which is because independently acquiring the data without the print authority database HDB 2 has no significance. Consequently, it is possible to realize the aforementioned system by use of the nonvolatile memory fitted in a manner replaceable from the outside of the image forming apparatus lwithout causing any security problem.

Note that data indicating the details of the processing (the details and the volume of the processing) is called processing detail data. The processing detail data and the ID information are also called processing management data. Moreover, the image formation counting processing and the image reading counting processing are subjected to the management in this embodiment, but only the image formation counting processing can be subjected to the management.

As described above, the image forming apparatus 1 according to one embodiment can abbreviate or resolve the bottle neck attributable to the hard disc drive under great loads of the hard disc drive writing processing and reading processing such as the color copying with high resolution when using the ADF 51, thereby improving the copy processing capability of the system as the whole. Further, the image forming apparatus 1 according to one embodiment can be easily realized by use of the auxiliary storage device 60 (nonvolatile memory) fitted in a replaceable manner without causing any security problem.

The inventor of the present application has found that "in copying a large volume at a high speed, a speed of access to the hard disc drive can be a bottle neck in the color printing with high resolution in particular.

On the contrary, it is possible to realize efficient image data writing and reading into and from the hard disc drive in this embodiment.

MODIFIED EXAMPLES

This disclosure can be implemented not only through the embodiment described above but also through modified examples described below.

Modified Example 1

In the embodiment described above, the auxiliary storage device 60 is adopted as the destination of the data storage for the management of the print processing such as the image formation counting processing and the image reading counting processing, but data storable into the auxiliary storage device 60 is not limited to the data for management. More specifically, for example, upon receiving a print job from a personal computer while color copying with high resolution using the ADF 51 is executed, the print job can be stored into the auxiliary storage device 60.

Modified Example 2

In the embodiment described above, the image forming apparatus 1 is formed as an image forming apparatus capable of color printing (color image formation), but this disclosure can also be applied to an image forming apparatus capable of only monochromatic printing. With the image forming apparatus capable of only monochromatic printing (monochromatic image formation), it is possible to realize, for example, high-speed monochromatic copying with high resolution when using the ADF 51.

Moreover, the configuration and the processing of the embodiment described above with reference to FIGS. 1 to 4 form just one embodiment and it is not intended to limit this disclosure to these configuration and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
    an image reading device reading an image on a document to generate image data indicating the read image;
    a hard disc drive storing: the image data generated; a database; and ID information, the database including image formation authority of a registered user registered as a user of the image forming apparatus and a remaining available amount, the ID information being for specifying the remaining available amount of the database to be updated based on processing detail data serving as data indicating processing details of the image forming apparatus;
    an image forming device forming an image on an image formation medium by use of the image data read from the hard disc drive;
    an auxiliary storage device having a nonvolatile memory and storing, into the nonvolatile memory, processing management data including the processing detail data; and
    a control device including a processor, and when the processor executes a control program, functioning as a controller controlling the image reading device, the hard disc drive, and the auxiliary storage device, and managing details of processing performed by the image forming device by use of the processing management data,
    wherein after ending of processing performed by the registered user, the controller uses the processing management data stored in the nonvolatile memory to update the remaining available amount specified by use of the ID information and deletes the processing management data from the nonvolatile memory in response to completion of the update.

2. The image forming apparatus according to claim 1, wherein
    the controller limits use by the registered user based on the image formation authority and the processing management data stored in the auxiliary storage device.

3. The image forming apparatus according to claim 1, wherein
    when the processing management data remains in the auxiliary storage device upon recovery of a power source of the image forming apparatus, the controller uses the processing management data remaining in the auxiliary storage device to update the remaining available amount and deletes the processing management data from the nonvolatile memory in response to the completion of the update.

4. The image forming apparatus according to claim 1, wherein
    the image reading device has an automatic document feeder and reads images on a plurality of documents supplied from the automatic document feeder to generate image data indicating the read images, and the controller stores the processing management data into the auxiliary storage device upon executing specific processing including copy processing using the automatic document feeder and stores the processing management data into the hard disc drive upon executing copy processing by a processing method other than the specific processing.

5. The image forming apparatus according to claim 1, wherein the auxiliary storage device is equipped in the image forming apparatus in a manner such as to be removable from an outside of the image forming apparatus.

6. The image forming apparatus according to claim 1, wherein the hard disc drive executes writing and reading only through sequential access to the image data.

7. The image forming apparatus according to claim 4, wherein the hard disc drive has a discoidal disc for storing data, has an outer circumferential track having more sectors than an inner circumferential track, and has constant linear recording density, and the hard disc drive allocates, on an outer circumference side of the hard disc drive, a dedicated specific processing track dedicated for the specific processing, and the controller uses the dedicated specific processing track upon executing the specific processing.

8. The image forming apparatus according to claim 1, wherein the image reading device has a high-speed processing mode in which the image data is stored into the auxiliary storage device at a ratio of one to N-number (where N is an integer of 2 or more), and the auxiliary storage device irretrievably erases the data in the nonvolatile memory in response to completion of the high-speed processing mode.

9. The image forming apparatus according to claim 4, wherein the image forming device is capable of making selection from color image formation and monochromatic image formation, and the specific processing includes copying processing through the color image formation using the automatic document feeder.

10. The image forming apparatus according to claim 4, wherein the image forming device is capable of making selection from a plurality of copy resolution levels, and the specific processing includes copying processing with the greatest resolution level included in the plurality of copy resolution levels, using the automatic document feeder.

11. The image forming apparatus according to claim 1, further comprising an operation display device, wherein the controller causes the operation display device to display an alarm when a difference between the remaining available amount specified by use of the ID information and a use amount indicated by the processing management data stored in the auxiliary storage device becomes equal to or less than a threshold value.

12. The image forming apparatus according to claim 1, wherein the controller irretrievably deletes the processing management data from the nonvolatile memory through a secure erase function in response to the completion of the update.

13. An image forming method, comprising:

an image reading step of reading an image on a document to generate image data indicating the read image;

a storage step of storing, into a hard disc drive: the image data generated; a database; and ID information, the database including image formation authority of a registered user registered as a user of an image forming apparatus and a remaining available amount, the ID information being for specifying the remaining available amount of the database to be updated based on processing detail data serving as data indicating processing details of the image forming apparatus;

an image forming step of forming an image on an image formation medium by use of the image data read from the hard disc drive;

an auxiliary storage step of using a nonvolatile memory and storing, into the nonvolatile memory, processing management data including the processing detail data; and a control step of controlling the image reading step, the storage step, and the auxiliary storage step and managing details of processing performed in the image formation step by use of the processing management data, wherein the control step includes a step of, after ending of processing performed by the registered user, updating, by use of the processing management data stored in the nonvolatile memory, the remaining available amount specified by use of the ID information and deleting the processing management data from the nonvolatile memory in response to completion of the update.

14. A computer-readable non-transitory recording medium storing an image forming program, the image forming program causing a computer including a processor to function as a controller when the processor executes the image forming program, wherein the image forming program further causes the computer to function so that the controller controls each of:

(i) an image reading device reading an image on a document to generate image data;

(ii) a hard disc drive storing: the image data generated; a database; and ID information, the database including image formation authority of a registered user registered as a user of an image forming apparatus and a remaining available amount, the ID information being for specifying the remaining available amount of the database to be updated based on processing detail data serving as data indicating processing details of the image forming apparatus; and (iii) an auxiliary storage device storing, into a nonvolatile memory, processing management data including the processing detail data, and manages, by use of the processing management data, details of processing performed by the image forming device which forms an image on an image formation medium by use of the image data read from the hard disc drive, and the controller, after ending of processing performed by the registered user, updates, by use of the processing management data stored in the nonvolatile memory, the remaining available amount specified by use of the ID information and deletes the processing management data from the nonvolatile memory in response to completion of the update.

\* \* \* \* \*